United States Patent [19]

North et al.

[11] Patent Number: 4,467,527
[45] Date of Patent: Aug. 28, 1984

[54] DIGITAL HEAD-OUT LEVEL

[76] Inventors: Larry North, 8577 Six Shooter Cir.; Bryant R. Gold, 10191 Dimple Dell Rd., both of Sandy, Utah 84092

[21] Appl. No.: 347,861

[22] Filed: Feb. 11, 1982

[51] Int. Cl.³ .............................................. G01C 9/06
[52] U.S. Cl. ......................................... 33/366; 33/391
[58] Field of Search ........................ 33/348.2, 366, 391

[56] References Cited

U.S. PATENT DOCUMENTS

| | | | |
|---|---|---|---|
| 1,300,818 | 4/1919 | Collins | 33/391 X |
| 2,922,874 | 1/1960 | Clerk et al. | 33/348.2 |
| 3,861,052 | 1/1975 | Siegfried | 33/366 |
| 4,063,366 | 12/1977 | Bane | 33/366 X |
| 4,132,004 | 1/1979 | Deschenes et al. | 33/366 |
| 4,167,818 | 9/1979 | Cantarella et al. | 33/366 |
| 4,182,046 | 1/1980 | Ludlow et al. | 33/366 |
| 4,253,242 | 3/1981 | McInerney | 33/366 |
| 4,277,895 | 7/1981 | Wiklund | 33/366 |
| 4,356,638 | 11/1982 | McKenna et al. | 33/366 X |
| 4,388,758 | 6/1983 | Ernst et al. | 33/1 PT |

FOREIGN PATENT DOCUMENTS

| | | |
|---|---|---|
| 1267433 | 5/1968 | Fed. Rep. of Germany . |
| 1548558 | 4/1970 | Fed. Rep. of Germany ........ 33/391 |
| 545424 | 7/1956 | Italy ..................................... 33/391 |

Primary Examiner—Harry N. Haroian
Attorney, Agent, or Firm—Thorpe, North & Western

[57] ABSTRACT

A digital level is disclosed that includes a digital display for displaying the angle of inclination between a straight edge of a digital level and a desired reference plane. An alarm is also included to indicate whenever the digital level is held parallel to a desired reference plane, such as a level horizontal plane, or a vertical plane. The level transducer employed within the digital level includes a rotating member that is weighted so as to always be aligned with a gravitational field in which the level is used. The body of the level includes flip-up sights so that it can readily be used as a transit. A microswitch located on the underneath side of the level automatically powers the circuitry used in connection with the sensing circuitry and digital display whenever the level is placed on a planar surface.

2 Claims, 12 Drawing Figures

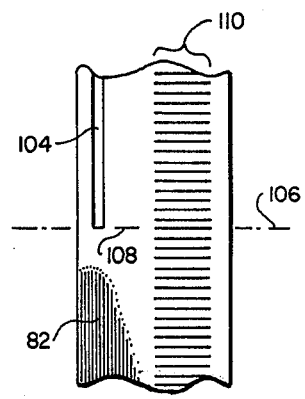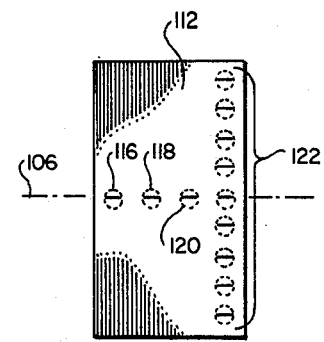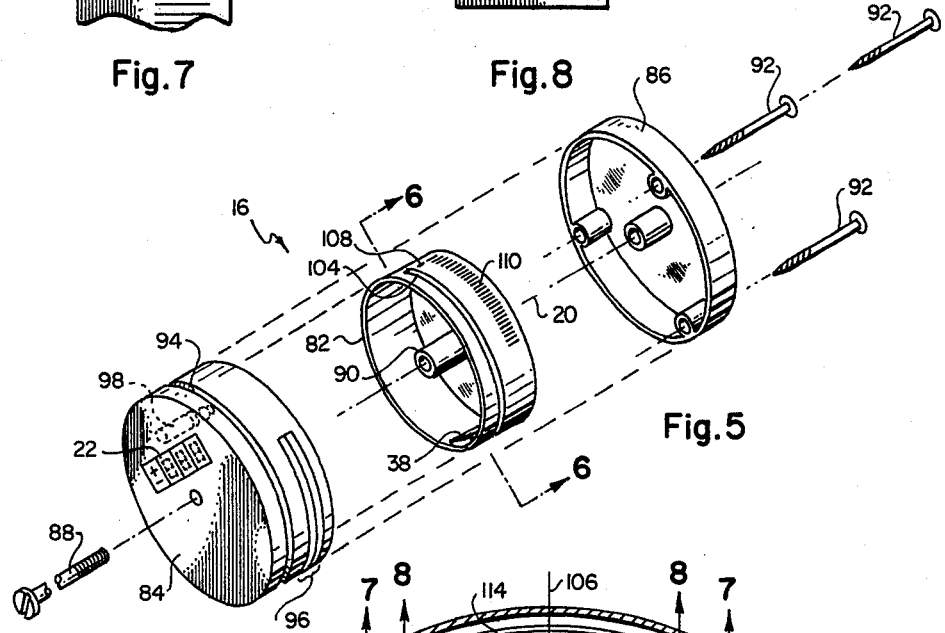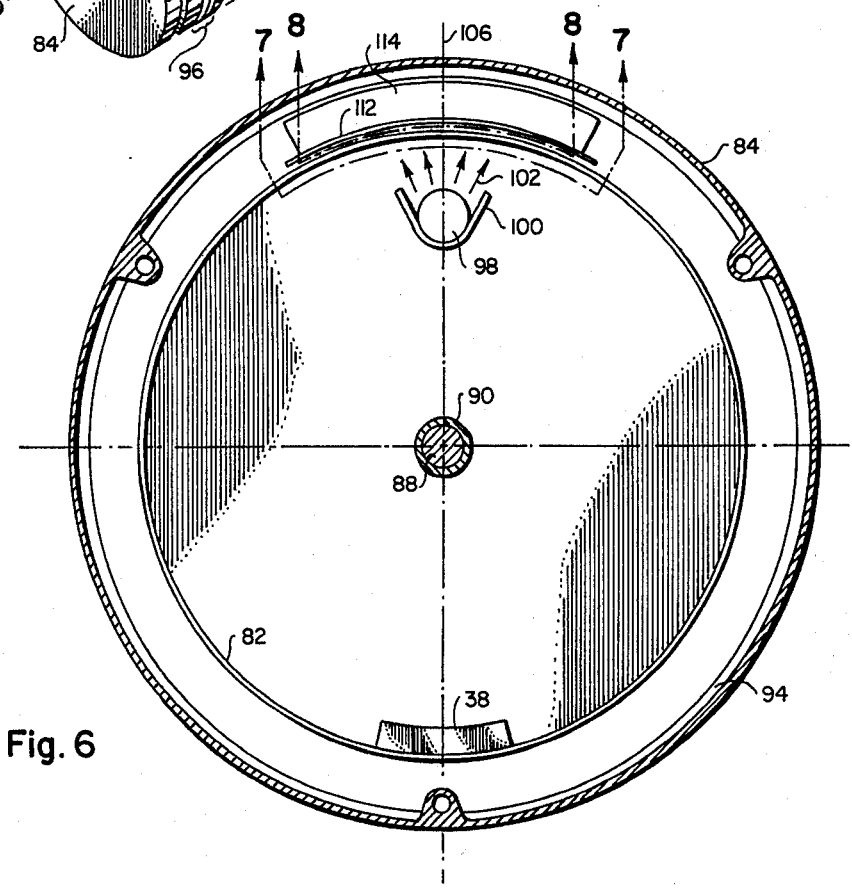

DIGITAL HEAD-OUT LEVEL

BACKGROUND OF THE INVENTION

This invention relates to leveling devices; and more particularly to leveling devices having a digital read-out that measure inclination or deviation from the horizontal or vertical.

Leveling devices, commonly referred to as "levels," have been used for many years for multi-varied purposes. Almost all persons engaged in the building industry, whether they be carpenters, brick masons, plumbers, and the like, have a need to use a level during some phase of the construction of the building or other project on which they are working. The most common form of level is the spirit level which utilizes a fluid in a vial or vials to indicate when a desired horizontal or vertical inclination has been reached. Spirit levels offer the advantage of being very simple in construction and operation. They consist merely of a rigid member or body having a straight edge along at least one side thereof. Mounted in this rigid body is a vial having a fluid therein. The fluid is disposed in the vial so as to not quite fill the vial, thereby leaving a bubble or air pocket. The vial, or tube-like member in which the fluid is placed has special markings thereon so that when the vial or tube is exactly horizontal, the indicating bubble will position itself between the markings. Thus, by merely observing the indicating bubble, and by placing the level on the inclination that is to be measured, an indication can be given whether this inclination is "level."

Spirit levels also typically include more than one tube or vial in which the indicating bubble may be observed. One vial or two is typically placed perpendicular to the straight edge of the body of the level, thereby allowing a measure of verticalness to also be made.

Despite the wide use and simplicity of the spirit level, there are problems associated therewith. In particular, spirit levels are of a fixed length. This necessitates that several spirit levels, each of a different length, be accessible to the construction worker who has needs of multi-length levels. Further, in using the spirit level, the indicating bubble appearing in the tube or vial must be visible. Thus, if a builder desires to measure a plane above his eyesight as to whether or not it is level, a builder must climb up on a ladder or similar means in order to look at the bubble in order to find out if, in fact, the desired plane is level. In addition, spirit levels are not very useful for finding or measuring an angle (other than perhaps 45°) that is not level. That is, spirit levels indicate a level condition only. They are not that useful for actually measuring an angle. Moreover, the spirit level is difficult to use as a quasi-transit. That is, builders often have a need to sight along a level line from one location to another in order to find a level point that is some distance from where they are standing. Heretofore, to make such a measurement a transit would have to be set up in order to provide an accurate, level, line-of-sight to the builder. Spirit levels do not lend themselves to providing such a level line-of-sight unless first mounted on a tripod or similar arrangement and held in a level position.

Other types of leveling devices are known in the art. For example, Gooley, U.S. Pat. No. 3,863,067, teaches electronic sensing means to sense the position of the indicating bubble of a spirit-level type device. Wright, U.S. Pat. No. 3,324,564, teaches an electrically responsive level whereby an analog indicator may be coupled with the vial or tube containing the bubble indicator, thereby providing an alternative visual indication of when the level condition is achieved. Higgins, U.S. Pat. No. 3,096,591, discloses a radio frequency leveling device that may remotely indicate a level condition, such as might be used in a missile field.

It is significant to note that all of these prior art devices are used to supplement the basic spirit level device. That is, it appears that all of these devices implement as an element thereof a tube or vial in which a fluid having an indicating bubble is inserted. Furthermore, in order to make the desired leveling measurements, external instrumentation equipment must be used. The use of such equipment not only makes it impractical to use the devices in the building industry, because the leveling devices and equipment are not as portable as a simple spirit level, but also makes the use of the levels impractical because of the expense involved.

SUMMARY OF THE INVENTION

It is an object of the present invention to provide a digital level that is accurate and simple to operate, having relatively few components therein.

It is a further object of the present invention to provide such a digital level that may be used not only to indicate a level (true horizontal or vertical positions), but also to provide a digital read-out showing the angle of inclination of the level from a preset reference. It is a further object of the present invention to provide such a level wherein an audible signal may be heard whenever the inclination of the level reaches a preset angle, which preset angle is variable.

It is still a further object of the present invention to provide such a digital level that may be readily used as a transit.

Another object of the present invention is to provide a simple, yet portable, digital level that may be used for either finding a true horizontal or a true vertical plane.

Still another object of the present invention is to provide a digital level having a calibration head therein that is removable, thereby allowing the head to be readily inserted into members of various lengths.

Still a further object of the present invention is to provide a digital level that is portable, that relies upon an internal power source, and that automatically shuts off the power source when the level is not in use.

The above and other objects of the present invention are realized in an illustrative embodiment that includes a main body having a straight edge along one side thereof. Inside this main body a level transducer is adjustably and removably mounted. This level transducer may be adjusted so as to measure the angle of inclination from any desired reference plane. This level transducer may also be removed from the main body and inserted into other main bodies of differing lengths. The level transducer is adapted to generate an electrical signal or signals that indicate the angle of inclination of the straight edge of the main body relative to a reference plane. No vials or tubes filled with a liquid substance and having bubble indicators therein are employed with the level transducer. Rather, in the preferred embodiment, the force of gravity causes a weighted rotating member to rotate so as to be aligned with the gravitational field. The movement of this rotating member is then sensed electronically and appropriate electrical signals are generated to indicate the magnitude of such movement.

In the preferred embodiment, the electronic circuitry is adapted to sense when the straight edge of the level body is aligned with the reference plane and to signal an audible alarm. Such alarm allows a user of the digital level to know when a desired inclination is achieved without having to have direct eye contact with the level indicator.

The digital display employed as part of the level converts the angle of inclination between the level's edge and the reference plane into readily understandable units, such as degrees bevel or a vertical distance that one end of the level would have to be raised in order to reach the desired reference plane.

BRIEF DESCRIPTION OF THE DRAWINGS

The above and other objects, features, and advantages of the present invention will be more apparent from the following more particular description presented in connection with the accompanying drawings, in which:

FIG. 5 is an exploded perspective view of still another alternative embodiment of a level transducer used in the digital read-out level of FIG. 1;

FIG. 6 is a sectional view taken along the line 6—6 of FIG. 5, assuming that the components of FIG. 5 have been assembled;

FIG. 7 is a sectional view taken along the line 7—7 of FIG. 6, showing the transducer drum detail;

FIG. 8 is a sectional view taken alon the line 8—8 of FIG. 6, showing the alignment plate detail of FIG. 6.

DETAILED DESCRIPTION OF THE INVENTION

Figure 1:
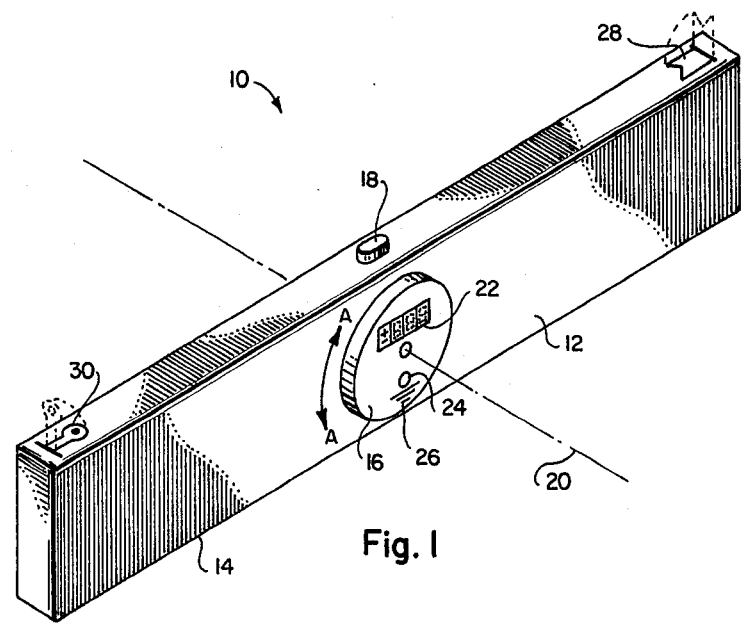
FIG. 1 is a perspective view of the digital read-out level of the present invention.

A perspective view of a digital read-out level 10 is shown in FIG. 1. The level 10 includes a body member 12, which may be of any desired length, having a straight edge 14 along the bottom side thereof. As shown in FIG. 1, the body 12 is an elongate member having a size and shape similar to that known for conventional spirit-levels. A level transducer 16 is mounted inside a center portion of the body 12. This level transducer 16 is detachably mounted so that it may be removed from the body 12 if desired. The transducer 16 is also rotatable, being rotatable about a central axis 20 as indicated by the arrows A—A. A locking bolt 18, or similar locking means, is used to hold the transducer 16 in a desired position, as well as to maintain the transducer 16 inside of the body 12.

A digital display 22 is included within the transducer 16. Also included as part of the transducers 16 is a control button or switch 24 and means for generating an audible tone which is heard through the slits or openings 26.

Across a top edge of the level body 12 is a front sight 28 and a rear sight 30. Advantageously, these sights 28 and 30 may be flipped to an upright position (as shown in the dashed lines in FIG. 1) so as to facilitate sighting the level in a desired direction. This feature, coupled with the audible tone that is generated when the body 12 is held in a desired inclination (such as a level inclination) advantageously allow the level to easily be used as a transit.

Figure 2:
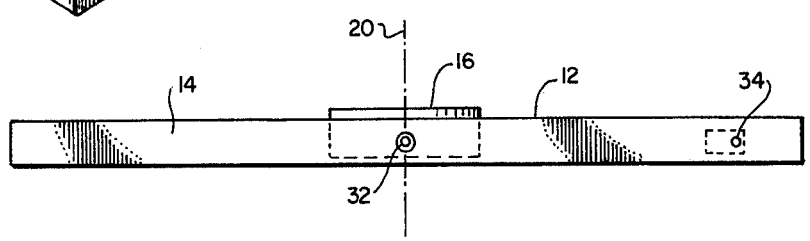
FIG. 2 is a bottom view of the digital level of FIG. 1.

A bottom view of the level 10 is shown in FIG. 2. The level transducer 16 protrudes out from the body 12 a short distance so as to enable a user to grab hold of the transducer 16 and rotate it to a desired reference position, or alternatively to remove the transducer from the level body 12. Alternatively, the transducer 16 could be recessed in or flush with the body 12 if suitable means were provided around the edge of the transducer 16 for allowing it to be rotated and detachably removed from the body 12.

Still referring to FIG. 2, a mounting sprocket 32 may be included on the bottom side of the level body 12 in order to allow the level to be permanently mounted to a tripod. Also included on the bottom edge 14 of the level 10 is a sensing switch or button 34. This switch or button may be realized with a commercially available microswitch which is activated with a minimum amount of force. The button 34 is spring loaded so as to protrude out from the edge 14 unless some force, however small, is used to push the button inward and flush with the straight edge 14. The spring force associated with the button 34 is selected so that the weight of the body 12 of the level 10 is sufficient to push the button in (and therefore flush with the edge 14) whenever the straight edge 14 is placed on any surface. The power source within the level transducer 16 is wired to the switch 34 so that it is operable only when the switch 34 is pushed in so as to be flush with the edge 14. Thus, whenever the level 10 is layed on its side, or otherwise carried so as not to have the straight edge 14 engaged with a surface or plane, the level transducer 16 is turned off, and the power source, typically a battery, is not depleted. However, as soon as the level is placed in its upright position on a surface whose angle of inclination is to be measured, the button 34 will automatically be depressed and the level transducer 16 is appropriately energized. Advantageously, whenever the level 10 is used as a transit, and the sides 30 and 28 are employed as a sighting means, the button 34 is positioned so that it can be easily depressed with the hand of a user of the level so as to activate the level transducer 16 at the desired time.

Figure 3:
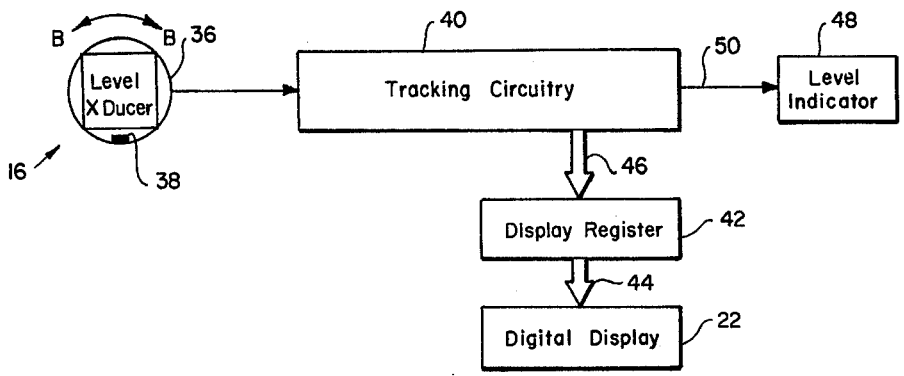
FIG. 3 shows a block diagram of the electronic circuitry used in connection with the digital read-out level of FIG. 1.

Referring next to FIG. 3, there is shown a block diagram of the electronic circuitry that is employed with the digital level 10. The level transducer 16 includes a rotating member 36 that may freely rotate in the direction shown by the arrows B—B. Typically, this rotating member 36 will include a weight 38, which weight is pulled by the force gravity to the lowest point that the rotation will allow it to achieve. The rotation of the rotating member 36 is sensed by tracking circuitry 40. Such tracking circuitry 40 tracks the rotation from a known starting point, typically a reference point generated by fixed or stationary components within the level transducer 16. Coupled to the tracking circuitry is a display register 42. The digital display 22 is coupled to the display register 42 over signal bus 44. Signal bus 46 couples the display register 42 to the tracking circuitry 40. A level indicator 48 is also coupled to the tracking circuitry 40 over signal line 50 so as to indicate when a level condition is achieved. Such a "level" condition occurs whenever the rotating member 36 of the level transducer 16 has rotated to a fixed position relative to stationary sensing elements incorporated as part of the level transducer 16. For most applications, these stationary components will be positioned relative to the level body 12 so that the level condition is achieved only when the straight edge 14 of the level 10 is either horizontal or vertical. However, by allowing the entire level transducer 16 to be rotatably adjusted, the relative position of the stationary elements may be selectively adjusted with respect to the straight edge 14 so as to allows the level indicator 48 to indicate a "level" condition with respect to any desired reference angle or inclination.

Figure 4A:
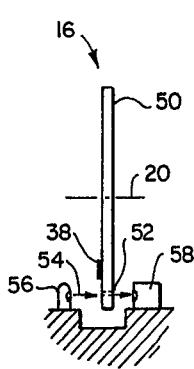
FIGS. 4A, 4B, 4C, and 4D respectively illustrates side views of alternative embodiments of a level transducer mechanism that may be employed with the digital read-out level of FIG. 1.

FIGS. 4A, 4B, 4C, and 4D illustrate respectively alternative embodiments that may be employed to realize the rotating member 36 within the level transducer 16. In FIG. 4A, for example, a rotating member 50 is a disc axially mounted to a center axis 20. Any appropriate method could be used to axially mount the disc 50 to the axis 20. A weight 38 is affixed to one location of the disc 50. The force of gravity thereby causes a disc 50 to rotate so that the weight 38 is at a lower position as shown in the figure. A hole 52 allows light 54 (or similar radiation) to radiate from an emitter 56, such as a light emitting diode (LED), to a receiver 58, such as a photo sensitive transistor. The emitter 56 and receiver 58 are permanently mounted within the level transducer 16 so as to not rotate except when the entire level transducer 16 is merely adjusted within the level housing 12. A plurality of holes similar to the hole 52 shown in FIG. 4A could be uniformly spaced around the circumference of the disc 50 so as to allow the rotation of the disc 50 to be sensed by the sensor 58.

Figure 4B:
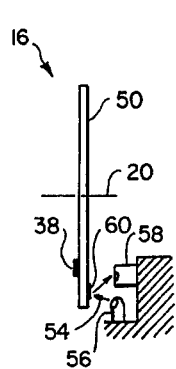

In FIG. 4B, a similar arrangement to that shown in FIG. 4A is illustrated. However, in FIG. 4B, the emitter 56 and sensor or receiver 58 are mounted on the same side of the disc 50. A suitable reflecting material 60 is affixed to the appropriate edge of the disc 50 so as to allow the light rays 54 transmitted from the emitter 56 to be reflected to the sensor 58. Advantageously, the reflective material 60 may be selectively positioned around the entire circumference of the disc 50 so as to allow rotation of the disc 50 to be sensed by alternately having the reflective material 60 reflect and not reflect (interrupt) the light ray 54 received at the sensor 58. Commercially available reflective material having patterns of light and dark areas etched thereon is available that could be secured to the entire face of the disc 50. In selecting such material, the primary criteria would be to choose a pattern that offered the desired resolution with respect to angular displacement. Those skilled in electronic art would be able to readily affix such a reflective pattern and use it in connection with the emitter 56 and sensor 58.

Figures 4C, 4D:
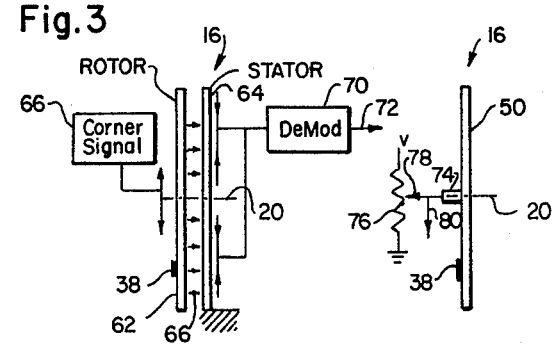

In FIG. 4C, still an alternative embodiment is shown for realizing the level transducer 16. A rotor 62 is rotatably mounted on an axis 20 in a similar fashion as is the disc 50 of FIGS. 4A and 4B. Juxtaposed a short distance from this rotor, having a face parallel to a face of the rotor is a stator 64, which does not rotate. An electrical conductor configured into a desired pattern is etched on the face of the rotor 62 that is closest to the stator 64. A carrier signal, from a carrier signal source 66, is then electrically connected to this conductor that is etched on the rotor 62 in a desired pattern. A similar electrical conductor is etched on the face of the stator closest to the rotor. Well known principles of electromagnetic radiation cause the carrier signal from the source 66 to be radiated or transmitted from the rotor conductor to the stator conductor. Such radiation or transmittal is represented symbolically in FIG. 4C by the small arrows 68. The patterns associated with the rotor and stator conductors are similar, and, when aligned, the amount of signal received at the stator has a maximum amplitude. Similarly, when the patterns of the rotor and stator are misaligned, the amplitude of the received signal at the stator is at a minimum. Thus, as the rotor rotates, the carrier signals received on the stator conductor is amplitude modulated as a function of the rotor position. This amplitude modulation may be demodulated in a demodulator 70 so as to generate a signal, appearing at the output of the demodulator 70 that indicates the angular displacement of the rotor from a known reference point. This signal may be readily used by those skilled in the art in tracking circuitry 40 so as to allow a digital level 10 to be realized.

In FIG. 4D, a further alternative embodiment for the level transducer 16 is shown. In this embodiment, a weighted disc 50 is rotatably mounted to an axis 20 as in FIGS. 4A and 4B. However, the disc 50 includes a rotating shaft 74 that is mechanically coupled to the shaft of a potentiometer 76. The potentiometer 76 is specially constructed so as to freely allow its wiper 78 to move therein as the shaft 74 rotates. Thus, by merely applying a reference voltage, v, to one end of the potentiometer 76, and grounding the other end, and by measuring the voltage at the wiper 78 over signal line 80, a signal (voltage) is generated that is proportional to the angular displacement of the disc 50. Those skilled in the art would readily be able to use this signal in tracking circuitry 40 (FIG. 3) so as to allow the invention to be practiced.

Referring next to FIG. 5, there is shown an exploded perspective view of still another alternative embodiment of a level transducer 16. This embodiment includes a rotating drum 82 that is sandwiched between a front cup 84 and a rear plate 86. A bolt 88, or similar shaft material, passes through the front cup 84, a cylindrical support member 90 of the rotating drum 82, and the rear plate 86. Screws 92 pass through appropriate holes in the rear plate 86 and are secured to appropriate portions of the inside of the front cup 84, thereby securely fastening the rear plate 86 to the front cup 84, with the rotating disc being rotatably mounted inside. The diameter of the rotating drum 82, as well as the inside diameter of the cylindrical support member 90, are selectively chosen so as to allow the rotating drum to freely rotate once mounted inside of the front cup 84 and rear plate 86. As with the other embodiments of the level transducer 16, a weight 38 is affixed to an inside edge of the rotating drum 84. The force of gravity will always exert a force on this weight 38 that tends to pull the drum so that the weight is in its lowest position.

The front cup 84 has mounted on a front face thereof the digital display 22. Inside thereof the requisite electronic circuitry as shown in the block diagram of FIG. 3 is housed. A groove 94 advantageously encircles the perimeter of the front cup 84. Appropriate engaging devices (not shown) are mounted within the body 12 of the digital level so as to become detachably engaged with the groove 94, thereby securing the entire level transducer assembly 16 within the housing 12. Using the groove 94 in this fashion, of course, allows the level transducer assembly 16 to be rotated to any desired position once inserted in the housing 12. A pair of conductive strips 96 are also disposed around at least one half of the circumference of the front cup 84. These conductive strips 96 are utilized to allow electrical power from a source external from the level transducer assembly 16 to be coupled thereinto. The use of such strips again allows the level transducer assembly 16 to be freely rotated without concerns of twisting the wires and the like.

Permanently mounted within the front cup 84 is a light 98. A light reflector 100 may be employed in connection with this light 98, as shown best in FIG. 6, so as to direct light rays 102 against the inside walls of the rotating drum 82. The light 98 could be realized with an LED or an incandescent light as desired. It is to be noted, that FIG. 6 is a sectional view taken along the line 6—6 of FIG. 5 assuming that all the components of the level transducer assembly 16 have been assembled.

The walls of the rotating drum 82 have three sets of holes or slits selectively placed around the circumference thereof. These sets of holes or slits are best shown in the sectional view of FIG. 7. The first is a narrow opening 104 that commences at the dead center reference point 106 and encircles approximately one half of the circumference of the drum 82. The second is a single small slit 108 that is positioned so as to be directly on the dead center reference point 106. The dead center reference point 106 is that point that is exactly 180° opposite the center of gravity of the weight 38. The third group of slits 110 comprise a plurality of slits similar to the single slit 108 that are equiangularly spaced at least around one half of the circumference of the drum 82. A typical angular displacement between each of the slits 110 would be 1°.

Permanently mounted within the front cup 84, and positioned so as to be juxtaposed from the circumferential edge or wall of the rotating drum 82, is a receiving plate 112. This receiving plate 112 is carefully positioned so as to receive the light rays 102 from the light 98 that pass through the slit 104, 108, or the slits in the set of slits 110. A sensor array 114 is carefully positioned behind the receiving plate 112. A directional sensor 116 is positioned, for example, to receive light through a corresponding slit placed in the receiving plate 112 that has passed through the slit 104 of the rotating drum 82. When a light ray is sensed by the sensor 116, it indicates that the rotating drum 82 is rotating in a certain direction from the dead center reference point 106. Thus, this sensor is used to indicate whether the angle being measured by the digital level is a positive or a negative angle.

In a similar fashion, a level sensor 118 is carefully positioned behind the sensor plate 112 so as to receive light rays that pass through the slit 108 of the rotating drum 82. This level sensor 118 thus receives light only when the rotating drum 82 has rotated to its dead center reference position. Assuming that the entire level transducer assembly has been set within the body 12 of the digital level 10 so as to measure angles relative to a level or a horizontal plane, then the sensor 118 will receive a ray of light 102 only when the straight edge 14 of the level body 12 is held in a perfectly horizontal or level position.

A degree sensor 120 is likewise positioned behind the receiving plate 112 so as to receive a ray of light 102 each time one of the slits 110 of the rotating drum 82 is directly in line therewith. As such, a ray of light is sensed by the degree sensor 120 each time the rotating drum 82 rotates 1°. It is to be noted that the ray of light received by the degree sensor 120 passes through only one end of the slits 110. As such, the degree sensor 120, in cooperation with one end of the slits 110, acts as a simple graduated scale that indicates rotation of the drum 82 in 1° increments.

In order to provide a more accurate measurement than can be achieved with the simple graduated scale that effectively realized by the degree sensor 120 and the slits 110, a set of vernier sensors 122 is selectively positioned behind the receiving plate 112 so as to selectively receive rays of light through the other end of the slits 110. The vernier sensors 122 are carefully positioned so that one and only one of the vernier sensors 122 receives light through one of the slits 110 whenever light is not received by the degree sensor 120. The vernier sensors 122 are also selectively positioned on a different scale than that of the slits 110. Thus, for example, whereas the degree sensor 120 is able to sense the rotation of the drum 82 to within 1°, the vernier sensors 122, coupled with the degree sensor 120, are able to sense the rotation of the rotating drum 82 to within one tenth of a degree. The vernier principle is well known in the art and is commonly used on micrometers, calipers, and the like for making very precise and fine measurements. Applicants are unaware, however, of any prior art wherein the vernier principle has been used in an optical fashion as is presented herein.

Figure 9:
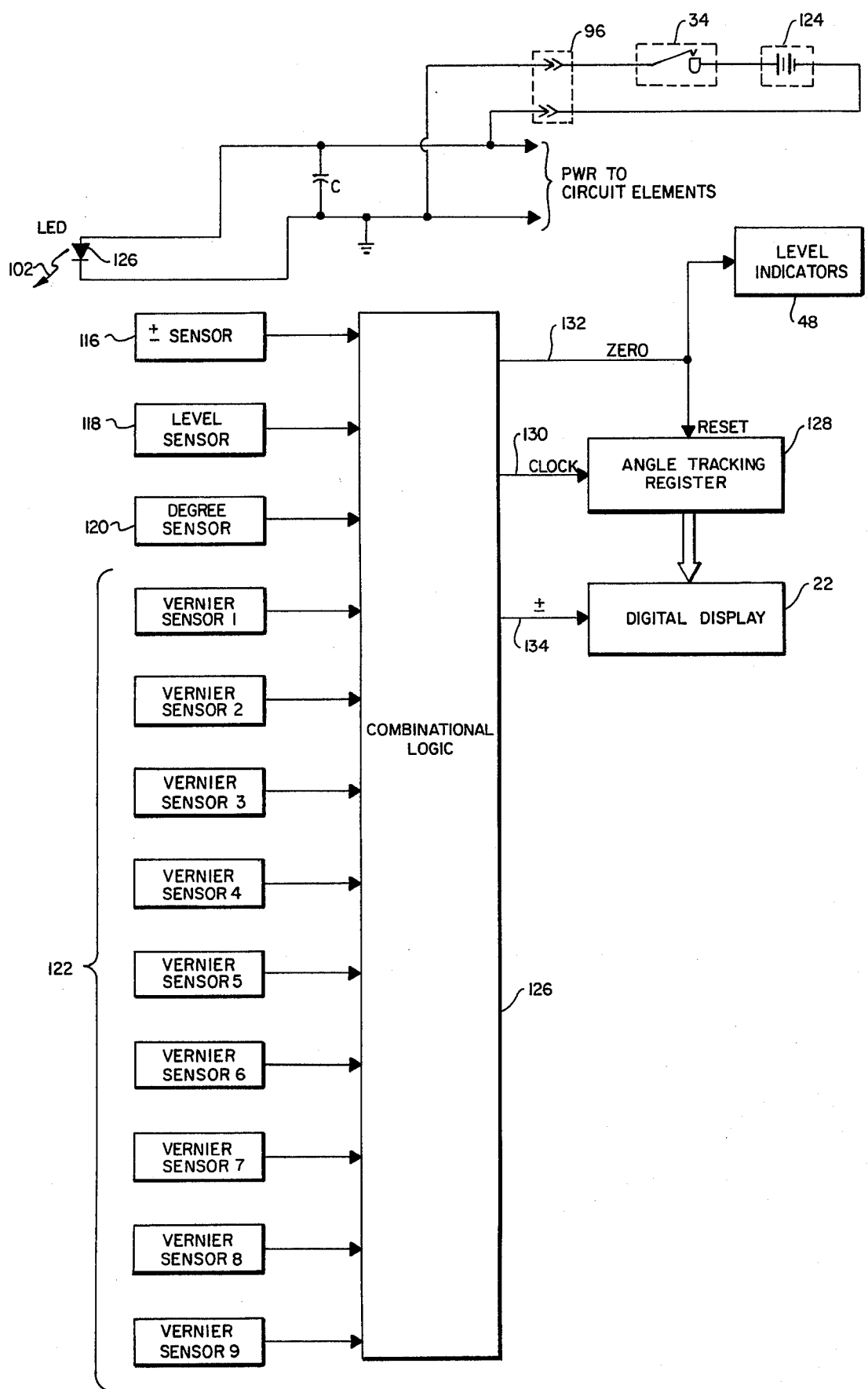
FIG. 9 is a block diagram of exemplary electrical circuitry that could be employed with the level transducer of FIG. 5.

Referring next to FIG. 9, there is shown a block diagram of exemplary electrical circuitry that could be employed with the level transducer 16 shown in FIG. 5. A battery 124 is housed somewhere within the level body 12. Power from this battery 124 is coupled through the microswitch 34 and the pair of conductive strips 96 (on the edge of the front cup 84) to the circuitry which is all housed within the front cup 84. A capacitor C is typically used to help stabilize the electrical potential that is ultimately received within the front cup 84. An LED 126 is shown in FIG. 9 for realizing the light 98. As shown, the LED will be energized whenever the microswitch 34 is depressed. A single LED, or other suitable light source, provides sufficient light rays 102 for sensing by all of the sensors 116, 118, 120, and 122. Each of these sensors is shown in FIG. 9 as blocks with appropriate labels therein. Signals received from these sensors are combined in combinational logic 126. An angle tracking register 128 (which is equivalent to the display register 42 shown in FIG. 3) is clocked from signals received from the combinational logic 126 over signal line 130. This angle tracking register 128 is reset by a reset pulse received over signal line 132, which reset pulse is generated by the combinational logic 126 each time a signal is received from the level sensor 118. The reset pulse is also used to trigger the level indicator 48, which may advantageously be an audible alarm. Other types of level indicators could also be employed, such as a light. The angle tracking register 128 merely counts the clock pulses received over signal line 130, which clock pulses are generated each time a different vernier sensor senses a ray of light in sequence. The digital display 22 converts the contents of the tracking register 128 to an appropriate digital display. A positive or negative indication is received over signal line 134 to indicate the relative direction of the angle that is thus displayed. This information is, of course, received from the directional sensor 116. Those skilled in the electronic art would be able to readily realize the elements shown in FIG. 9 in order to realize the invention. Moreover, such circuitry could be readily miniaturized so as to easily fit within the front cup 84. Thereby allowing the important circuitry to be housed within the level transducer assembly 16.

In operation, a digital level 10 disclosed herein may be used by inserting an appropriate digital level transducer assembly 16 into any suitable body 12 of a desired length. The level transducer assembly 16 may be rotated, and secured with the locking nut 18, so that the angle of inclination will be measured from a desired reference plane. For most applications, this desired reference plane will either be a horizontal level plane, or a vertical plane (in which case the level transducer assembly 16 is rotated 90°). Suitable detent means may be employed so as to aid a user of the level to find or locate the desired positions where the level transducer assembly 16 will measure the angle of inclination from a desired reference plane.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. A digital level for use in a gravitational force field comprising:
   a main body having a straight edge along one side thereof;
   signal means rotatably mounted to said main body for generating at least one electrical signal that indicates the angle of inclination of a reference plane associated with said signal means relative to a level plane, said level plane being orthogonal to the gravity forces of said gravitational force filed, said signal means being mounted to said main body such that said reference plane is parallel to said straight edge, said signal means further comprising:
   a rotating cylindrical member axially mounted on a central shaft secured to said main body, said rotating member being adapted to freely rotate about a central axis defined by said shaft;
   a weight attached to said rotating member, said weight being adapted for rotation to a lowest point by gravity forces, thereby causing said rotating member to rotate to a fixed reference position with respect to said level plane, said fixed reference position of said rotating member serving to define said reference plane;
   optical tracking means for tracking the rotation of said rotating member and generating said electrical signal, said electrical signal indicating the angular rotation through which said rotating member has rotated from said reference position;
   register means responsive to said electrical signal for displaying the angle of inclination of said straight edge relative to said level plane; and
   power supply means mounted within said main body for powering said signal means and register means, wherein said rotating member comprises a cylindrical drum, said drum having a diameter that is greater than its length, and said drum being adapted to rotate about the central axis passing through the center of its ends, and wherein said tracking means comprises
   a stationary light source adapted to shine a light against the inside wall of said cylindrical drum;
   a plurality of apertures selectively placed around the wall of said cylindrical drum, including;
      a reference position aperature,
      a set of angular displacement aperatures, each aperature of said set being equiangularly spaced around the wall of said cylindrical drum, and
      a direction aperature, comprising a continuous slit that begins at said reference position aperature and traverses at least one quarter of the distance around the circumference of said drum;
   a housing structure inside of which said cylindrical drum is rotatably mounted;
   a plurality of light sensors selectively affixed to said housing structure, each of said light sensors being adapted to receive a ray of light from said light source that has passed through one of said aperatures, and to generate a tracking signal when said light ray is received, including;
      a reference position sensor affixed to said housing so as to receive a ray of light through said reference so as to receive a ray of light through said reference position aperature only when said drum has rotated to its fixed reference position,
      a direction sensor affixed to said housing so as to receive a ray of light through said direction aperature whenever said drum has rotated in a prescribed direction form said reference position,
      an angular displacement sensor affixed to said housing so as to receive a ray of light through one of said angular displacement aperatures each time said drum rotates a prescribed angular displacement, and
      a plurality of venier sensors selectively affixed to said housing so that said venier sensors selectively receive a ray of light through said angular displacement aperatures depending upon the fractional portion of said prescribed angular displacement that said drum has rotated; and
   counting and logic circuitry for promoting the tracking signals received from each of said plurality of sensors and keeping track of the angular displacement of said drum with respect to said reference position, and for further providing said electrical signal to said digital display means.

2. A digital level as defined in claim 1 wherein said plurality of venier sensors are selectively affixed to said housing so that one and only one of said venier sensors receives a ray of light through one of said angular displacement aperatures for a given angular displacement of said drum.

* * * * *